United States Patent
Singh et al.

(10) Patent No.: US 12,519,654 B2
(45) Date of Patent: Jan. 6, 2026

(54) PREVENTING ILLEGAL, MALICIOUS AND THEFT OF E-SIGNATURES WHILE REUSING E-SIGNATURES FROM MOBILE DEVICE

(71) Applicant: Citrix Systems, Inc., Fort Lauderdale, FL (US)

(72) Inventors: Manbinder Pal Singh, Coral Springs, FL (US); Sotirios Karnaros, Patras (GR)

(*) Notice: Subject to any disclaimer, the term of this patent is extended or adjusted under 35 U.S.C. 154(b) by 596 days.

(21) Appl. No.: 17/845,587

(22) Filed: Jun. 21, 2022

(65) Prior Publication Data
US 2023/0318846 A1    Oct. 5, 2023

Related U.S. Application Data

(63) Continuation of application No. PCT/GR2022/000021, filed on Apr. 5, 2022.

(51) Int. Cl.
*H04L 9/32* (2006.01)

(52) U.S. Cl.
CPC .................. *H04L 9/3247* (2013.01)

(58) Field of Classification Search
CPC .................................................. H04L 9/3247
See application file for complete search history.

(56) References Cited

U.S. PATENT DOCUMENTS

| | | | |
|---|---|---|---|
| 9,059,858 B1 | 6/2015 | Giardina et al. | |
| 9,286,281 B2 | 3/2016 | Dunn et al. | |
| 9,565,175 B1* | 2/2017 | Saylor | H04L 67/56 |
| 9,679,190 B2 | 6/2017 | Bartlett, II et al. | |
| 10,970,378 B2 | 4/2021 | Bendersky | |
| 2005/0154889 A1* | 7/2005 | Ashley | H04L 9/3234 |
| | | | 713/171 |
| 2013/0205380 A1 | 8/2013 | Avni et al. | |
| 2015/0358400 A1 | 12/2015 | Bartlett, II et al. | |
| 2016/0189147 A1* | 6/2016 | Vanczak | H04L 63/0853 |
| | | | 705/71 |
| 2016/0308678 A1* | 10/2016 | Bhatnagar | H04L 9/3228 |
| 2019/0305963 A1* | 10/2019 | Kopp | H04L 9/3263 |
| 2021/0112057 A1* | 4/2021 | Secunda | H04W 12/104 |
| 2024/0129130 A1* | 4/2024 | Semenovskiy | G06Q 20/3825 |

OTHER PUBLICATIONS

Singh, Manbinder Pal; "Distributed Electronic Signature Processing," U.S. Appl. No. 17/363,928, filed Jun. 30, 2021.
International Search Report and Written Opinion for International Application No. PCT/GR2022/000021, dated Nov. 17, 2023, 11 pages.

* cited by examiner

*Primary Examiner* — Viet D Vu (57) ABSTRACT

A technique for applying signatures to documents stores a user signature in a first device and selectively releases the user signature for incorporation into documents only after performing validation. The validation includes the first device scanning a machine-readable code displayed by a second device. The first device and the second device participate in respective sessions with an online system, which stores a document to be signed. The first device extracts information from the machine-readable code and attempts to validate that information with the online system. If the validation is successful, the first device may release the user signature, e.g., by sending the user signature to the online system for incorporation into the document.

21 Claims, 8 Drawing Sheets

PREVENTING ILLEGAL, MALICIOUS AND THEFT OF E-SIGNATURES WHILE REUSING E-SIGNATURES FROM MOBILE DEVICE

BACKGROUND

Electronic versions of documents to be signed are quickly becoming the first choice of many businesses and other entities, which prefer them for their speed of execution and added convenience. Some electronic documents are provided as PDF (portable document format) files, word-processing files, or files in other formats. Such documents may be sent to parties, e.g., by email or text message. Parties may print, sign, scan, and return their documents. In some instances, documents include signature fields that allow parties to enter signatures directly, e.g., using a keyboard or mouse.

Some businesses prefer to use electronic signature services. In a typical scenario, a user prepares a document for electronic signature. The user uploads the document to a document server and specifies parties as signatories to the document, e.g., by providing their email addresses or cell phone numbers. The user may add one or more fields for data entry, and such fields may include one or more signature fields. Once all needed fields have been placed into the document, the user may submit the document for online execution. For example, the document server responds to the user's submission by sending an email or other communication to each specified party. Each party can click on the link, and a version of the document opens, e.g., in a browser or app on the party's computer or other device. The party can review the agreement, enter any requested data into fields prepared for this purpose, and sign the document. The party may then submit the signed document, e.g., by clicking or tapping a button. Submitting the document may direct the document server to store the signed document online for safekeeping.

SUMMARY

Unfortunately, available methods for entering signatures into documents can be inconvenient. For example, users may be required to type or draw a new signature for every document to be signed. This requirement can be burdensome for users who need to sign multiple documents in one sitting. Also, many users operate devices that lack touchscreens or the like, meaning that the users may need to enter signatures manually using a keyboard or mouse, for example, which may cause signatures to lack a natural look or to be messier than they might otherwise be. Further, existing signature methods can lack security. In some cases, anyone with access to a user's device can view a document and sign without the user's consent. Storing signatures on remote systems may seem like a good option, but doing so can invite risks if signatures are ever disclosed. Further, some remote systems, such as non-persisted virtual machines, may not be capable of storing user data between user sessions and thus cannot reliably store user signatures. What is needed is a more convenient and secure method of applying signatures to documents.

The above need is addressed at least in part by an improved technique for applying signatures to documents. The improved technique stores a user signature in a first device and selectively releases the user signature for incorporation into documents only after performing validation. The validation includes the first device scanning a machine-readable code displayed by a second device. The first device and the second device participate in respective sessions with an online system, which stores a document to be signed. The first device extracts information from the machine-readable code and attempts to validate that information with the online system. If the validation is successful, the first device may release the user signature, e.g., by sending the user signature to the online system for incorporation into the document.

Advantageously, the improved technique enables users to sign documents based on stored signatures, which may be neatly formed and entered into documents automatically, without the users laboriously having to enter their signatures manually. The improved technique is also secure, as it requires validation as a condition for releasing a signature. Various optimizations may be applied for cases where users have multiple documents to sign at once, including optimizations that allow users to avoid having to scan any machine-readable code after executing a first document.

Certain embodiments are directed to a method that includes scanning, by a first device having a first session with an online system, a machine-readable code displayed by a second device having a second session with the online system. The machine-readable code indicates information about the second session and is displayed by the second device in connection with a document of the online system. The method further includes participating, by the first device, in a communication with the online system to validate the information indicated by the machine-readable code and transmitting, responsive to validation of the information, a user signature stored in the first device to the online system, such that the online system is enabled to enter the user signature into the document to effectuate signing of the document.

In some examples, the information includes a session ID (identifier) of the second session and a username of the second session, and validating the information includes confirming that the online system associates the session ID of the second session with the username of the second session.

In some examples, the first session is associated with a username, the information includes a username associated with the second session, and validating the information includes confirming that the username of the second session matches the username of the first session.

In some examples, the second session is between the second device and a virtual machine hosted by the online system. The information includes a session ID (identifier) of the second session and an IP (Internet protocol) address of the virtual machine, and validating the information includes confirming that the online system associates the session ID of the second session with the IP address of the virtual machine.

In some examples, the second session is between the second device and a virtual machine hosted by the online system. The information includes a session ID (identifier) of the second session, a username of the second session, and an IP (Internet protocol) address of the virtual machine, and validating the information includes: confirming that the online system associates the session ID of the second session with the username of the second session; confirming that the username of the second session matches the username of the first session; and confirming that the online system associates the session ID of the second session with the IP address of the virtual machine.

In some examples, the method further includes prompting a user of the first device to provide an additional authentication factor to the first device, wherein transmitting the user signature is further responsive to successful validation of the additional authentication factor.

In some examples, the method further includes, after transmitting the user signature to the online system, receiving, by the first device, a request from the online system to obtain the user signature for signing a second document; prompting, by the first device, a user of the first device to authorize transmission of the user signature; and, in response to the first device receiving authorization from the user and without the first device scanning or rescanning any machine-readable code, transmitting the user signature to the online system, such that the online system is enabled to enter the user signature into the second document to effectuate signing of the second document.

In some examples, prompting the user of the first device to authorize transmission of the user signature includes requesting an additional authentication factor from the user.

In some examples, the second session is between the second device and an application of the online system.

In some examples, the method further includes, prior to transmitting the user signature: generating, by the first device, a client public/private key pair that includes a client public key and a client private key; sending, by the first device, the client public key to the online system; receiving, by the first device, a message from the online system, the message encrypted using the client public key and including a server public key of a server public/private key pair; decrypting, by the first device, the message using the client private key, the decrypting revealing the server public key; and encrypting, by the first device, the user signature using the server public key.

In some examples, generating the client public/private key pair is performed by one of a trusted platform module or secure enclave of the first device.

Other embodiments are directed to a method that includes establishing, by an online system, a first session with a first device and a second session with a second device and transmitting, by the online system, a machine-readable code to the second device to enable the second device to display the machine-readable code, the machine-readable code associated with a document of the online system and indicating information about the second session. In response to the online system receiving the information from the first device after the first device has scanned the machine-readable code, the method further includes (i) validating the information and (ii) sending a successful validation result to the first device. After sending the successful validation result, the method still further includes receiving a user signature from the first device and applying the user signature to the document to effectuate signing of the document.

In some examples, the method further includes enforcing a requirement that the signature be entered into the document based on the authorization by the first device.

In some examples, the method further includes prohibiting the signature from being entered into the document from the second device.

In some examples, the information indicates a user associated with the second session, and validating the information includes confirming that the user associated with the second session matches a user associated with the first session.

In some examples, the second session is between the second device and a virtual machine hosted by the online system. The information includes a session ID (identifier) of the second session and an IP (Internet protocol) address of the virtual machine, and validating the information includes confirming, by the online system, that the session ID of the second session is associated with the IP address of the virtual machine.

In some examples, the second session is between the second device and a virtual machine hosted by the online system, and transmitting the machine-readable code to the second device includes (i) rendering the machine-readable code within an application running on the virtual machine and (ii) enabling the second device to display output of the application.

In some examples, the application is configured with a plugin that renders machine-readable codes with respective documents provided for signature.

In some examples, the plugin requires that signatures be entered in documents based solely on validation of machine-readable codes and not based on any other signature-entry methods.

In some examples, the method further includes, after applying the user signature to the document to effectuate signing of the document: presenting a second document for signature without transmitting any additional machine-readable code; sending a request to the first device to authorize signing of the second document; receiving, based on authorization by the first device, the user signature from the first device; and applying the user signature to the second document to effectuate signing of the second document.

Other embodiments are directed to a computerized system constructed and arranged to perform any of the methods described above. Still other embodiments are directed to a computer program product. The computer program product stores instructions which, when executed on control circuitry of a computerized system, cause the computerized system to perform any of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIGS. 5*a*-5*c* are collectively a sequence diagram that indicates an example method that may be carried out in the environment of FIG. 1.

DETAILED DESCRIPTION

Embodiments of the improved technique will now be described. One should appreciate that such embodiments are provided by way of example to illustrate certain features and principles but are not intended to be limiting.

An improved technique for applying signatures to documents stores a user signature in a user device and selectively releases the user signature for incorporation into documents only after performing validation. Advantageously, the improved technique enables users to sign documents based on stored signatures, which may be neatly formed and entered into documents automatically, without the users laboriously having to enter their signatures manually.

Figure 1:
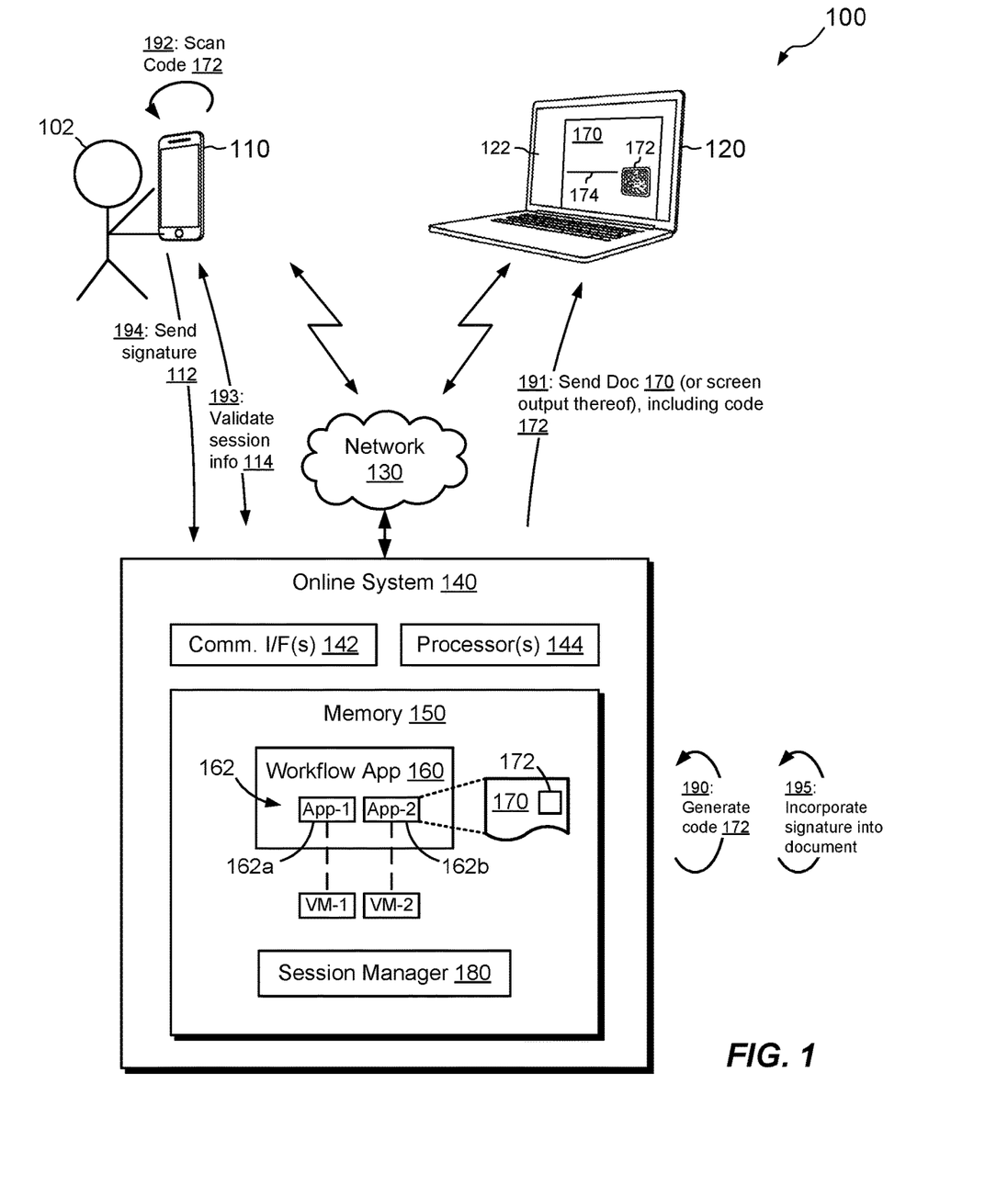
FIG. 1 is a block diagram of an example environment in which embodiments of the improved technique can be practiced.

FIG. 1 shows an example environment 100 in which embodiments of the improved technique can be practiced. The environment 100 includes a first device 110, a second device 120, a network 130, and an online system 140.

In an example, the first device 110 is a mobile device, such as a smart phone, tablet computer, or the like, which includes or is connected to a camera. In an example, the second device 120 is a laptop computer, desktop computer, or the like, which includes or is connected to a display. These are merely examples, as the first device 110 and the second device 120 may be realized in a variety of ways. Although not specifically shown, the first device 110 and the second device 120 each include one or more communication interfaces, one or more processors, and memory. The processors and memory form respective control circuitry, which is constructed and arranged to carry out various methods and functions as described herein.

The network 130 may be any type of network or combination of networks, such as a local area network (LAN), a wide area network (WAN), the Internet, and/or some other type of network or combination of networks. In an example, the first device 110 and the second device 120 are both connected (e.g., wirelessly or by wired connections) to a LAN, which is connected to the Internet via a router. The online system 140 may also be connected to the network 130, e.g., via a separate router or by any other means. One should appreciate that a wide variety of network arrangements may be used, and the particulars of those arrangements are not critical to this disclosure.

As further shown in FIG. 1, the online system 140 includes a set of communication interfaces 142, a set of processors 144, and memory 150. The set of communication interfaces 142 includes, for example, one or more network interface adapters for converting electronic and/or optical signals received over the network 130 to electronic form for use by the online system 140. The set of processors 144 includes one or more processing chips and/or assemblies, such as numerous multi-core CPUs (central processing units). The memory 150 includes both volatile memory, e.g., RAM (Random Access Memory), and non-volatile memory, such as one or more ROMs (Read-Only Memories), disk drives, solid state drives, and the like. The set of processing units 144 and the memory 150 together form control circuitry, which is constructed and arranged to carry out various methods and functions as described herein. Also, the memory 150 includes a variety of software constructs realized in the form of executable instructions. When the executable instructions are run by the set of processors 144, the set of processors 144 is made to carry out the operations of the software constructs. Although certain software constructs are specifically shown and described, it is understood that the memory 150 typically includes many other software components, which are not shown, such as an operating system, various applications, processes, and daemons. One should appreciate that the online system 140 may be realized using any number of physical computers, which may be provided in one or more data centers or server farms, for example.

As further shown in FIG. 1, the memory 150 "includes," i.e., realizes by execution of software instructions, a workflow application 160 and a session manager 180. In an example, the workflow application 160 provides user access to various applications 162, such as App-1 (162a) and App-2 (162b). In an example, users may access the applications 162 as virtualized applications, which may run on respective virtual machines (e.g., VM-1 and VM-2). Certain ones of the applications 162 may realize virtual desktops, which allow users to access entire virtual machines, i.e., desktops, applications, file systems, and so forth, remotely over the network 130. Session manager 180 tracks user sessions with the various applications 162, or with the workflow application 160 generally. For example, a user 102 may be logged onto the workflow application 160 or any of its applications 162 via the first device 110. Likewise, the same user 102 may be logged onto the workflow app 160 or any of its applications 162 via the second device 120.

In example operation, the first device 110 and the second device 120 participate in respective sessions with the online system 140. For example, the user 102 may log onto the online system 140 from the first device 110, thereby establishing a first session. The user 102 may also log on to the online system 140 from the second device 120, thereby establishing a second session. Although not required, the first device 110 and the second device 120 may connect to respective applications 162 of the online system 140. Such applications 162 may run remotely on the online system 140, with their screen content displayed on the first and/or second devices and their user interfaces operable by the first and/or second devices.

In an example, the second device 120 connects to application 162b, which is provided as a document-processing application, such as a PDF (portable document format) application (e.g., Adobe Acrobat, Foxit PDF Editor, etc.) or a word-processing application (e.g., Microsoft Word, WordPerfect, etc.), for example. As shown, the document-processing application 162b has opened a document 170, which has been provided for signature. The document 170 may be stored in the online system 140 and may originate from any source, such as an email message to the user 102, a text message, or any other source.

In an example, the first device 110 securely stores a user signature 112 of the user 102. For example, the user signature 112 may be an encrypted file or data structure that records a copy of the user's signature. The signature may be a scanned or otherwise digitized version of a manual signature made by the user 102, or it may be formed in any other way, e.g., by typing or by drawing using a mouse or other pointer device, for example.

In an example, the user signature 112 of the user 102 may be securely applied to the document 170 as follows. At 190, the application 162b generates a machine-readable code 172. The machine-readable code 172 may be provided as a QR (quick-response) code, as a barcode, and/or as any other type of code that may be displayed on screens of computing devices and read by digital cameras. In an example, the machine-readable code 172 is encoded with information about the second session, i.e., the session between the second device 120 and the online system 140.

At 191, the online system 140 provides the screen output of application 162b to the second device 120, which displays the screen output. Such screen output includes a view of the document 170 and the machine-readable code 172. In some examples, the document 170 includes a signature-entry field 174, which is provided for receiving a signature. Although generation of the code 172 at step 190 has been described as preceding the step 191 of providing screen output to the second device 120, this is merely an example. Alternatively, the application 162b may generate the code 172 at a later time, such as when the user 102 is reviewing the document 170 on the second device 120. In an example, the application 162b generates the code 172 in response to a user action, such as the user 102 clicking the signature field 174. In this case, the code 172 may appear on the display of the second device 120 (e.g., in the document 170 or in another window) after the user 102 clicks in the field 174.

At 192, the user 102 operates the first device 110 to scan the code 172 being displayed by the second device 120. For example, the user 102 points a camera of the first device 110 at a display 122 of the second device 120 and takes a photo of the code 172. The first device 110 includes a code reader (e.g., a QR-code reader), which responds to the photo of the code 172 by converting the code into corresponding text. In this example, the converted code includes text that provides information 114 about the second session, i.e., the session between the second device 120 and the online system 140.

At 193, the first device 110 attempts to validate the session information 114 with the online system 140. Such validation may leverage the fact that both the first session and the second session are with the same online system 140, which may store a variety of information about the respective sessions in the session manager 180. For example, the session information 114 may include a username associated with the second session, and validation of the session information 114 may include confirming that the username associated with the second session matches a username associated with the first session (i.e., between the first device 110 and the online system 140). As another example, the session information 114 may include both a username associated with the second session and a session ID (identifier) of the second session. In this case, validation of the session information 114 may include confirming that the online system 140 associates the indicated username of the second session with the indicated session ID. As yet another example, the session information 114 may include a session ID of the second session as well as an IP (Internet Protocol) address of the virtual machine that runs the application 162b being operated by the second device 120. In this case, validation of the session information 114 may include confirming that the online system 140 associates the indicated session ID with the indicated IP address. The above-described validations may be performed individually or in any combination. Also, other validations may be performed besides those described, e.g., based on specific knowledge about the user 102 and/or devices 110 and 120. Thus, the described validations should be regarded merely as examples. Although session information 114 has been described as being directly encoded in the code 172, session information may alternatively be accessed indirectly. For example, the code 172 may include a URL (uniform resource locator) of a webpage that provides the session information 114.

The validation at step 193 can detect and prevent many kinds of mischief. For example, validating that usernames match between the first and second sessions ensures that both devices 110 and 120 are logged on to the online system 140 under a common username. Thus, a fraudster using his or her own mobile device would need to steal the credentials of a legitimate user to get past this validation check. Validating that the username of the second session is associated with the session ID of the second session means that a fraudster would need to have direct access to the code 172 (which includes the session ID) displayed by the second device 120 in order to get past this check, as the session ID cannot easily be guessed. Likewise, validating that the session ID of the second session and the IP address of the VM running the application 162b also requires direct access to the code 172, as neither the session ID nor the IP address could be easily guessed.

Although not specifically shown in FIG. 1, the validation step 193 may further include prompting the user 102 to enter an additional authentication factor, such as a PIN (personal identification number), a token code, or a biometric credential, for example. The user may enter a biometric credential by performing a fingerprint scan, a retinal scan, a facial recognition scan, a voice scan, or the like. If the additional authentication factor or any of the other validation checks described above fails, then the signature process may terminate.

Assuming that all validation checks succeed, then at 194 the first device 110 sends the user signature 112 to the online system 140. The user signature 112 is preferably sent in encrypted form.

At 195, the application 162b incorporates the user signature 112 into the document 170, e.g., by replaying or otherwise rendering the user signature 112 within the signature field 174 of the document 170. The signed document can then be saved and distributed in whatever way the user requires.

Notably, the user 102 has been able to enter the user signature 112 into the document 170 without having to manually type or draw the signature, and without having to print, sign, and scan. In addition, the validation of session information greatly enhances security and prevents many types of fraud.

Although not specifically shown, one should appreciate that the first device 110 may be equipped with enhanced functionality, e.g., via a local agent or app, which enables the first device 110 to participate in the signing process.

Figure 2:
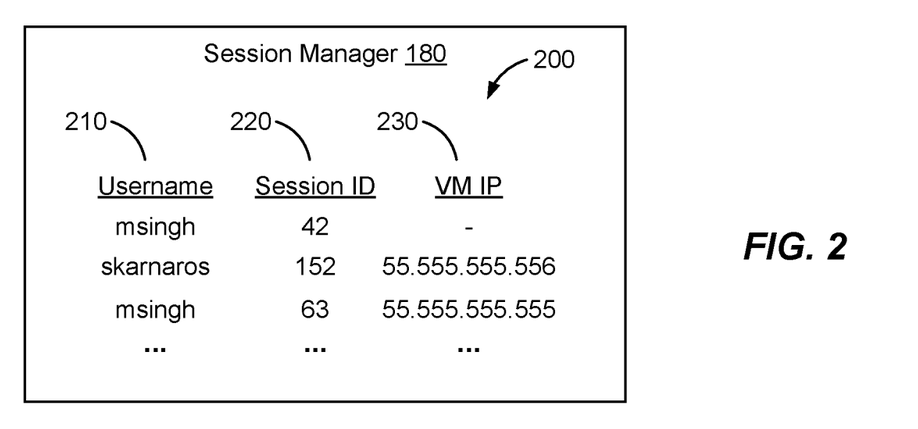
FIG. 2 is a block diagram of an example session manager of FIG. 1 in additional detail.

FIG. 2 shows an example session manager 180 in greater detail. As shown in the depicted table 200, the session manager 180 organizes various information about sessions with the online system 140, such as usernames 210, session IDs 220, and virtual machine (VM) IP addresses 230. Other session-related information may be included, as well, such as details of users and/or devices. Rows of the table 200 represent respective sessions. For example, a user "msingh" is seen to have two active sessions, one having session ID "42" and another having session ID "63." Session 42 is seen to have no associated VM IP address, whereas session 63 has an associated IP address of 55.555.555.555. In the example, session 42 may represent the first session of FIG. 1 between the first device 110 and the workflow application 160, whereas session 63 may represent the second session of FIG. 1 between the second device 110 and the application 162b. In this case, the IP address 55.555.555.555 is that of the VM on which the application 162b runs. User "skarnaros" is also logged on using session ID 152, for accessing an application 162 run by a VM having IP address 55.555.555.556. Although shown as a simple table 200, one should appreciate that the session manager 180 may arrange session information in a variety of ways, the particulars of which are not critical to the disclosure.

Figure 3:
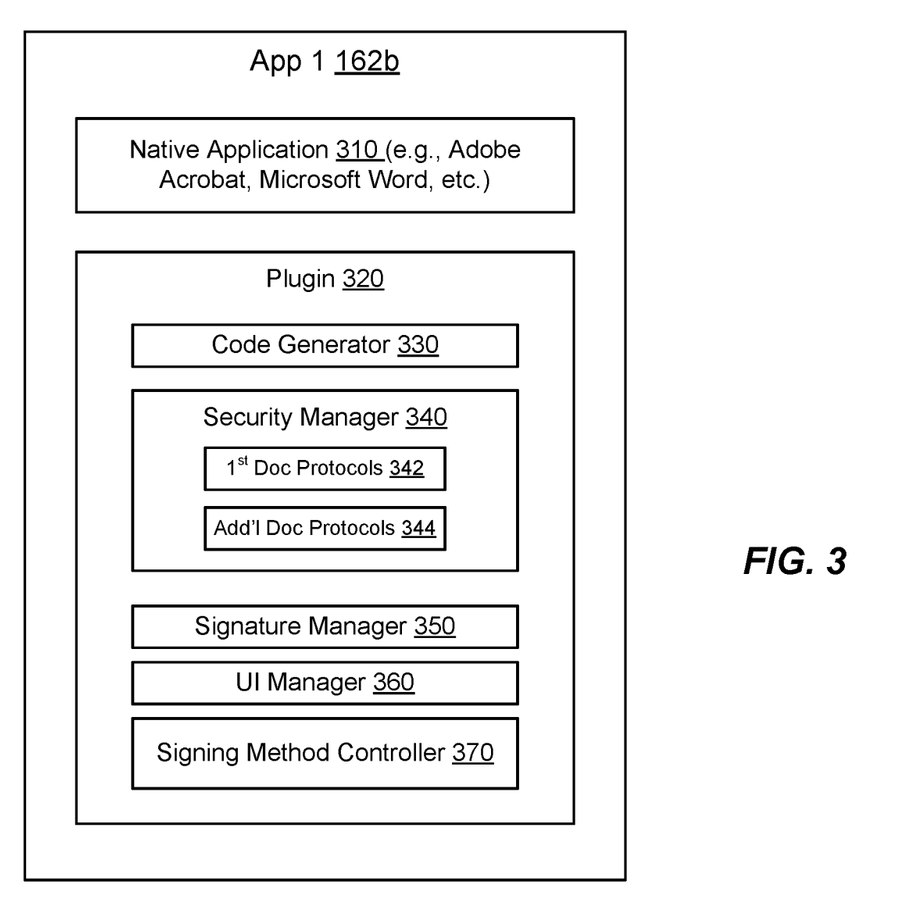
FIG. 3 is a block diagram of an example software application accessible from the online system of FIG. 1.

FIG. 3 shows an example document-processing application 162b in greater detail. Here, application 162b is seen to include a native application (e.g., Adobe Acrobat, Microsoft Word, etc.) as well as a plugin 320. The plugin 320 is constructed and arranged to augment the capabilities of the native application 310 by supporting functionality and protocols for obtaining user signatures. In the example shown, the plugin 320 includes the following components:

Code generator 330. Obtains session information (e.g., from session manager 180) of session through which application 162b is accessed; generates machine-readable code 172 that encodes the session information.

Security manager 340. Participates in security protocols for obtaining user signatures. May include one protocol 342 for a first document to be signed and another protocol 344 for additional documents to be signed.

Signature manager 350. Automatically incorporates signatures into documents, e.g., by replaying or otherwise rendering signatures obtained from user devices in signature fields of documents.

UI manager 360. Provides enhanced user-interface functionality to support various methods of signature entry. For example, enables users to enter signatures by typing, drawing, and/or by using the automated signature entry disclosed herein, e.g., based on obtaining a user signature stored on a user device.

Signing method controller 370. Allows users, administrators, and/or policies to limit entry of signatures to specific methods. For example, a policy may limit signature entry only to the automated entry method described above, which is based on user signatures stored on user devices, thus prohibiting typed or drawn signatures. Thus, the policy may enforce a requirement that a signature be entered into a document based on the authorization by the first device. The policy may likewise prohibit a signature from being entered into a document from the second device. This arrangement prevents malicious actors from fraudulently signing on the second device after the legitimate user of the second device has left the area.

One should appreciate that the plugin 320 may support a variety of features and functions associated with obtaining and applying user signatures to documents. Therefore, the above-listed components should be regarded merely as examples.

Figure 4:
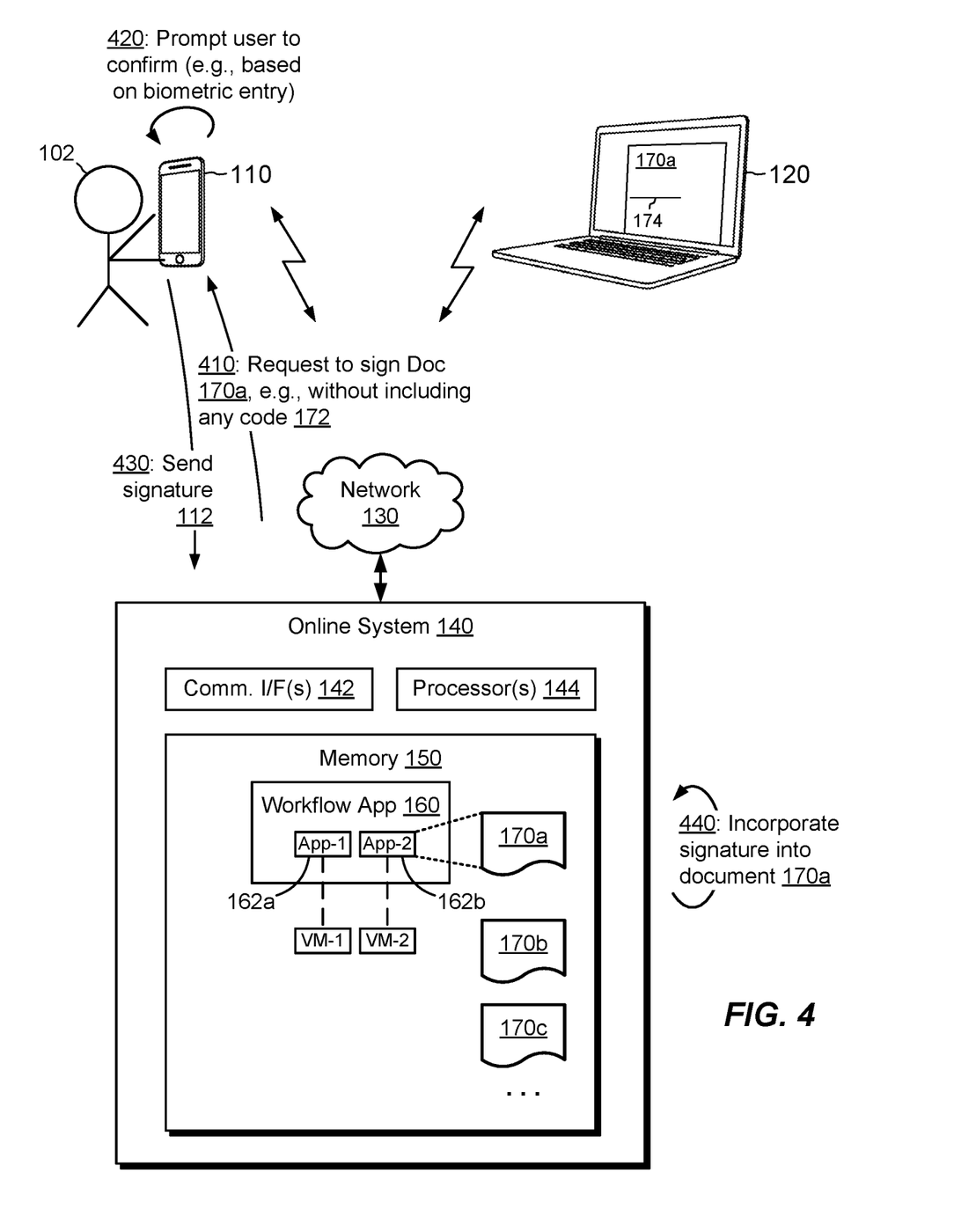
FIG. 4 is a block diagram showing an example arrangement for enabling users to sign multiple documents in succession.

FIG. 4 shows an example arrangement for entering user signatures into additional documents, such as documents 170a, 170b, and 170c. The arrangement of FIG. 4 may be carried out in the same environment 100 as shown in FIG. 1, but the depicted events take place after the document 170 has been successfully signed. Thus, the arrangement of FIG. 4 applies to the situation in which the user 102 has multiple documents to sign and a first document has already been signed.

As the user 102 has already successfully signed the document 170 (e.g., by scanning the code 172 and passing all of the validation checks; see FIG. 1), the user 102 may proceed to sign additional documents without having to rescan the code 172 and without having to scan any new code. An example sequence may proceed as follows.

At 410, the application 162b sends a request to the first device 110 for signing a document 170a (a second document). The request need not be accompanied by any code 172 displayed on the second device 120.

At 420, the first device 110 prompts the user 102 to authorize transmission of the user signature 112. For example, the first device 110 prompts the user to enter a biometric credential (e.g., a fingerprint scan, retinal scan, facial recognition scan, voice scan, etc.) or other additional authentication factor as a condition for releasing the user signature 102.

At 430, assuming the additional authentication factor is successfully validated, the first device 110 sends the user signature 112 to the online system 140. At 440, the application 162b incorporates the user signature 112 into the document 170a, e.g., by operation of the plugin 320. The document 170a is thus signed, with the only burden to the user 102 being to supply the additional authentication factor.

In some examples, if the first device 110 is already unlocked, then the need to provide the additional authentication factor can be avoided. For example, the unlocked device, upon receiving the request at 410, may simply prompt the user to confirm the consent to sign by a simple action, such as tapping a button on a touchscreen. If the user 102 pauses signing activities for more than a short while, the first device 110 may become locked and the user may need to supply the additional authentication factor (e.g., biometrically authenticate) before being allowed to proceed with other documents.

Signing of additional documents, e.g., 170b, 170c, etc., may be carried out using a similar technique to the one described for document 170a. Thus, any number of documents can easily and conveniently be signed by the user 102 with minimal effort.

To promote security as well as user convenience, the plugin 320 may enforce a policy that limits signature-entry options to those described in connection with FIGS. 1 and 4. Thus, for example, the options to enter signatures by typing or drawing may be disabled.

Figure 5A:
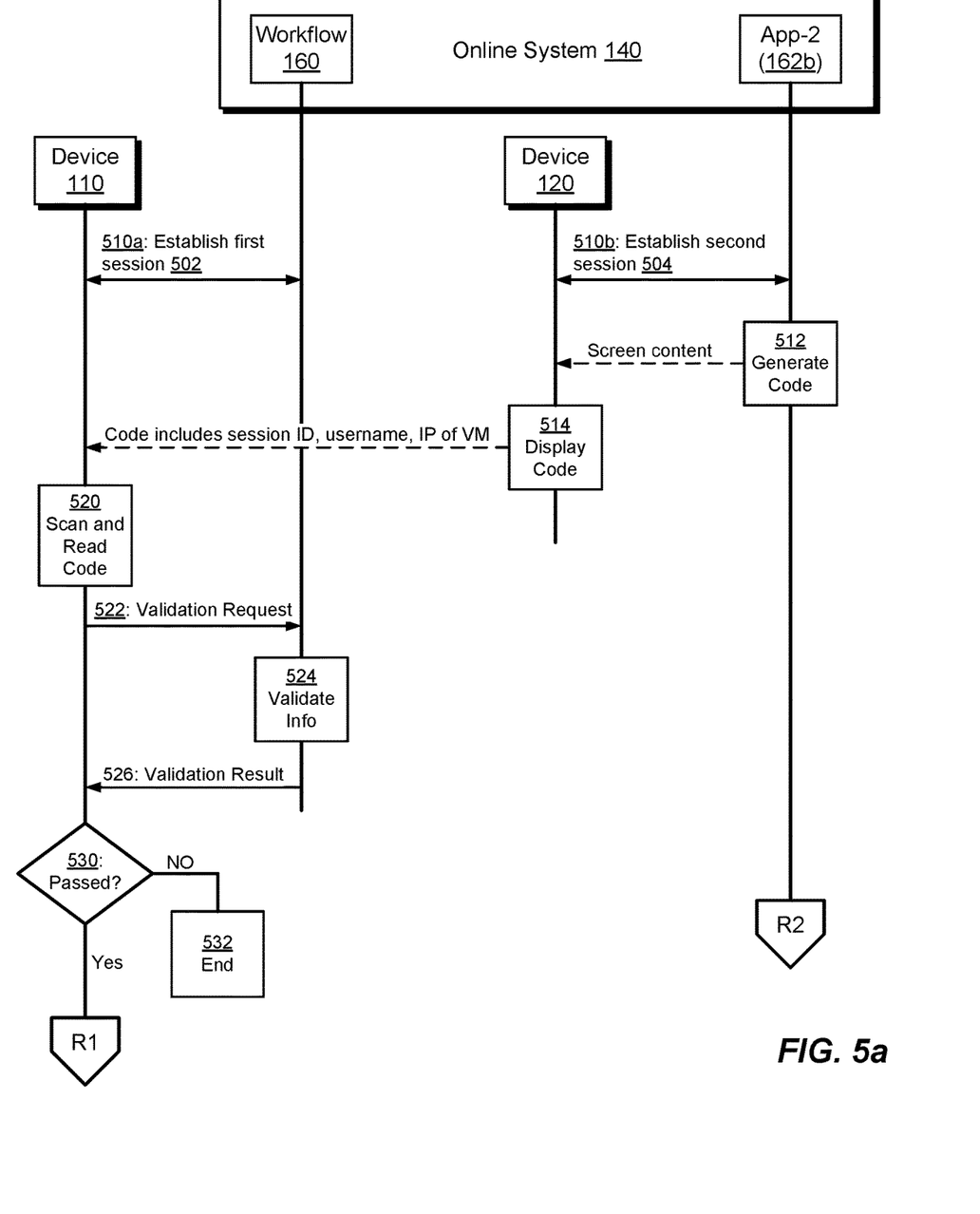
Figure 5B:
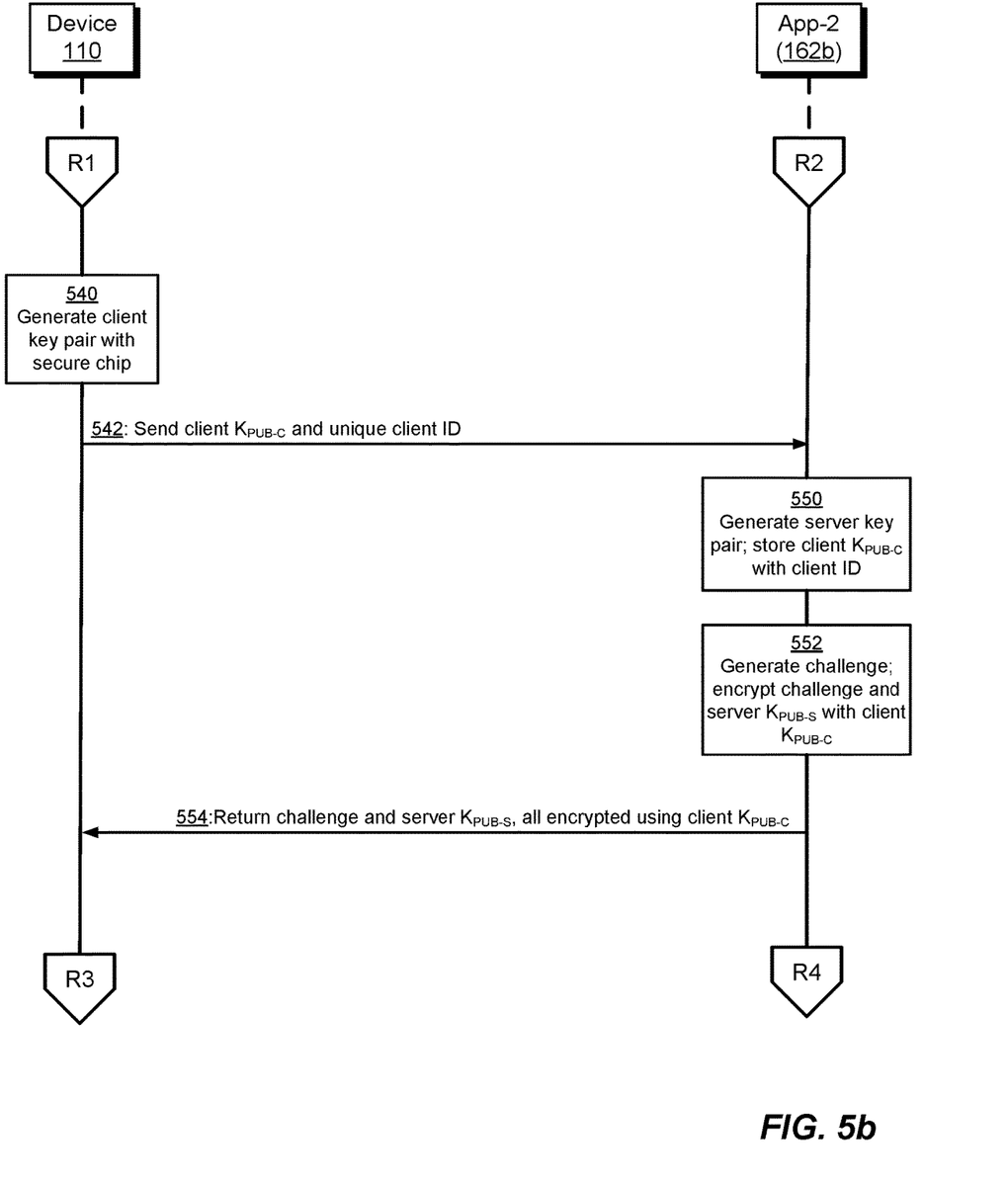
Figure 5C:
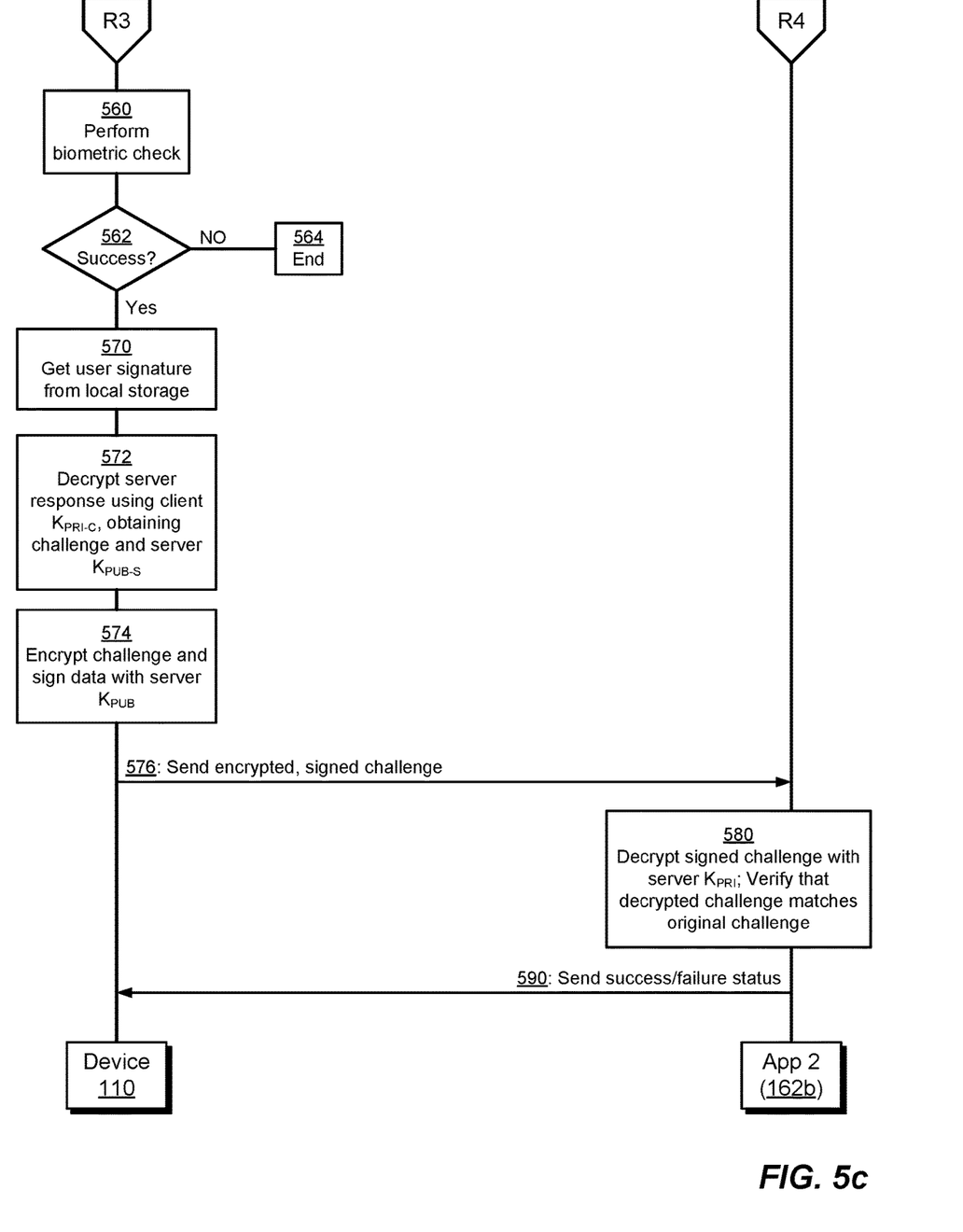

FIGS. 5a-5c show an example sequence for entering a user signature 112 into a document 170 in greater detail. The activities depicted in FIGS. 5a-5c involve the first device 110, the second device 120, and components of the online system 140, such as the workflow application 160 and the above-described document-processing application 162b.

At 510a, the first device 110 establishes a first session 502 with the online system 140, e.g., with the workflow application 160. Likewise, at 510b the second device 120 establishes a second session 504 with the online system 140, e.g., with the document-processing application 162b. The first session 502 and the second session 504 may be established in any order. Referring briefly back to FIG. 2, the first session 502 may correspond to session ID 42 and the second session 504 may correspond to session ID 63.

At 512, the application 162b generates a machine-readable code 172, such as a QR code, which contains information about the second session 504. Such session information may include, for example, a username associated with the second session 504 (e.g., "msingh"), an associated session ID (e.g., 63), and an associated IP address of the virtual machine on which application 162b runs (e.g., 55.555.555.555).

At 514, the second device 120 displays the code 172, e.g., along with the document 170 to be signed. For example, the application 162b is a virtualized application for which screen content is rendered by the application 162b but displayed on the second device 120.

At 520, the first device 110 scans the code 172 being displayed on the second device 120. The first device 110 then reads the code 172 and extracts the information 114 about the second session 504.

At 522, the first device 110 participates with the online system 140 in validating the information 114, e.g., by sending the information 114 to the workflow application 160 and requesting validation.

At 524, the online system 140 determines whether the information 114 is valid. For example, the session information 114 includes a username 210 associated with the second session 504, and the validation at step 524 includes confirming that the username associated with the second session 504 matches a username 210 associated with the first session 502. As another example, the session information 114 includes both a username 210 associated with the second session 504 and a session ID 220 of the second session 504. In this case, validation includes confirming that the indicated username 210 is associated with the indicated session ID 220. As yet another example, the session information 114 includes a session ID of the second session as well as an IP (Internet Protocol) address of the virtual machine that runs the application 162b. In this case, validation includes confirming that the online system 140 associates the indicated session ID with the indicated IP address. Act 524 may perform all of these validations or any subset of them.

At 526, the online system 140 returns a validation result to the first device 110. The validation result may be expressed as either a pass result or a fail result, for example.

At 530, the first device 110 determines whether validation returns a pass result or a fail result. If a fail result is returned, then the signature process may terminate at 532. If a pass result is returned, operation proceeds. The sequence then continues in FIG. 5b, with activities of the first device 110 identified by reference R1 and activities of the application 162b identified by reference R2.

As shown in FIG. 5b, if the validation passes, operation proceeds to 540, whereupon the first device 110 initiates secure communications with the application 162b. For example, the first device 110 generates a client key pair, which includes a client public key $K_{PUB-C}$ and a client private key $K_{PRI-C}$. In an example, the client key pair is generated by a secure chip of the first device 110, such as a trusted platform module (TPM) or a secure enclave. It is noted that the user signature 112 need not be stored in the secure chip but may rather be stored elsewhere in the first device 110.

At 542, the first device 110 sends the client public key, $K_{PUB-C}$, to the application 162b. At this time, the first device 110 may also send a unique identifier of the first device 110, which may help the application 162b to distinguish public keys of different devices, e.g., in a multi-tenant environment.

At 550, the application 162b receives the client public key and generates its own server key pair, which includes a server public key $K_{PUB-S}$ and a server private key $K_{PRI-S}$. At this time, the application 162b may also store the client public key $K_{PUB-C}$, e.g., in connection with the unique identifier of the first device 110.

At 552, the application 162b generates a challenge, such as an arbitrary text string. The application 162b may then use the server public key $K_{PUB-S}$ to encrypt both the challenge and the client public key $K_{PUB-C}$.

At 554, the application 162b returns the encrypted challenge and the encrypted client public key $K_{PUB-C}$ in a message to the first device 110. Operation then proceeds to 560 in FIG. 5c, via references R3 and R4.

At 560, the first device 110, having received the encrypted challenge and encrypted client public key $K_{PUB-C}$, performs additional validation by prompting the user 102 to enter an additional authentication factor, such as a biometric credential. If the additional authentication factor is not validated, then the procedure ends (at 564). Otherwise, operation proceeds to 570, whereupon the first device 110 acquires the user signature 112 from local storage.

At 572, the first device 110 decrypts the message received at 554 using the client private key $K_{PRI-C}$, thereby obtaining the challenge as well as the server public key, $K_{PUB-S}$.

At 574, the first device 110 encrypts the challenge using the server public key $K_{PUB-S}$, and at 576 the first device 110 sends the encrypted challenge back to the application 162b.

At 580, the application 162b decrypts the challenge using the server private key, $K_{PRI-S}$ and checks that the decrypted challenge matches the original challenge created during step 552. If the two challenges match, the application 162b produces a pass result; otherwise, it produces a fail result.

At 590, the application 162b sends the pass or fail result back to the first device 110. If the result is a pass result, then validation is successful and the first device 110 sends the user signature 112 to the application 162b of the online system 140. The application 162b then incorporates the user signature 112 into the document 170, as described previously. If the result is a fail result, then the device 110 does not release the signature and the signature process ends.

Figure 6:
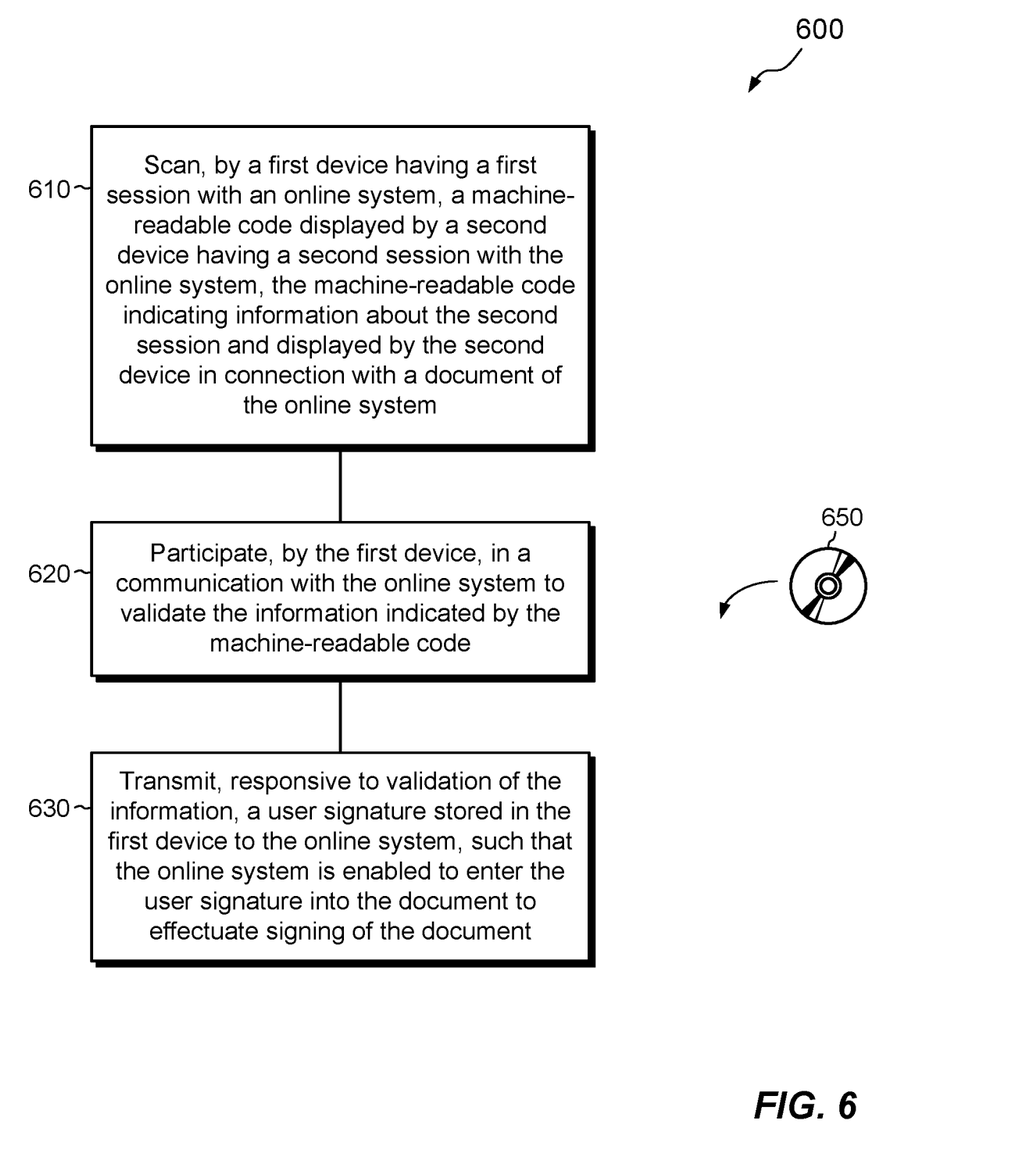
FIG. 6 is a flowchart showing an example method that may be carried out by the first device of FIG. 1.
Figure 7:
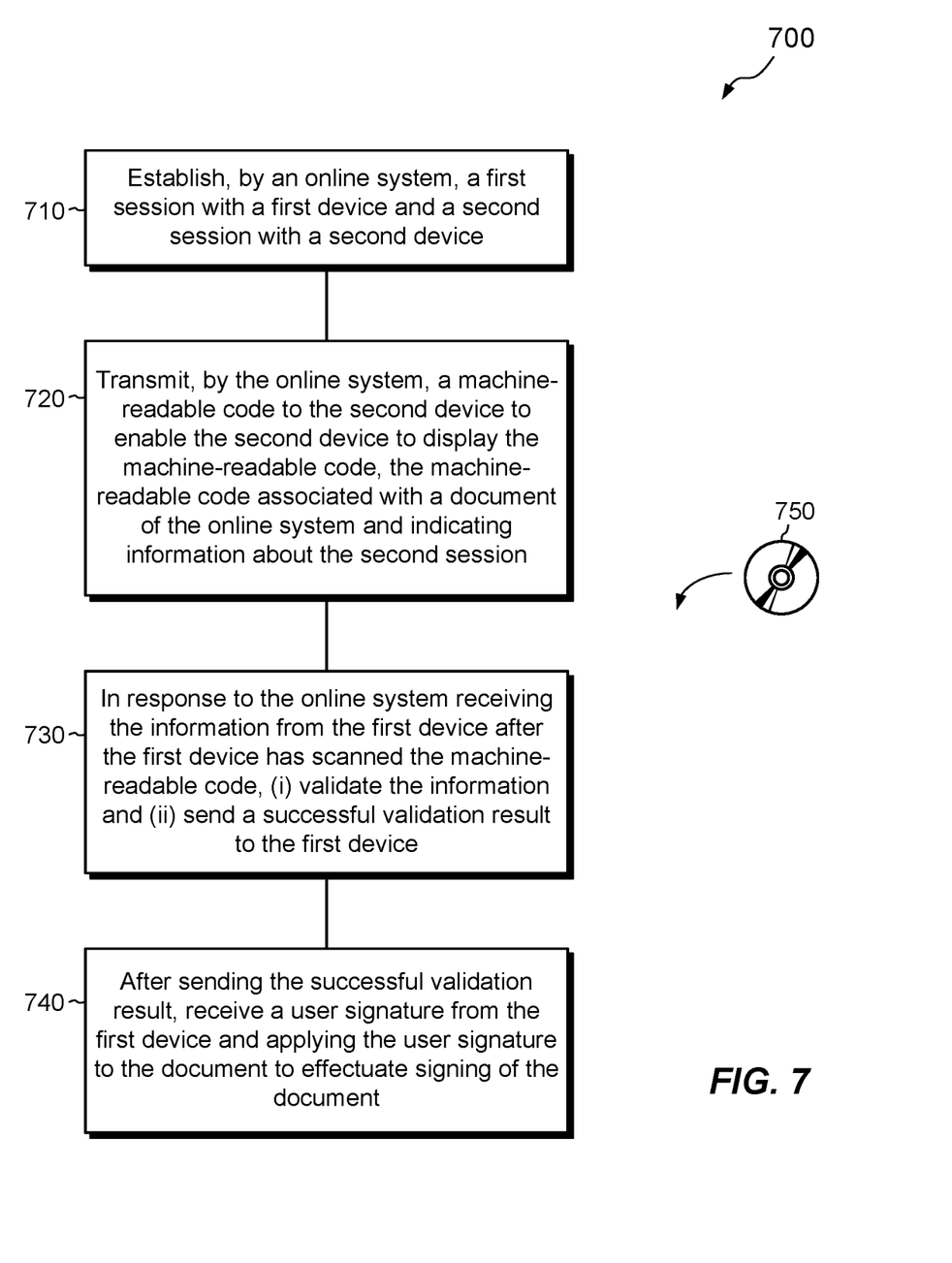
FIG. 7 is a flowchart showing an example method that may be carried out by the online system of FIG. 1.

FIGS. 6 and 7 show example methods 600 and 700 that may be carried out in connection with the environment 100 and provides an overview of some of the activities and features described above. The various acts of methods 600 and 700 may be ordered in any suitable way. Accordingly, embodiments may be constructed in which acts are performed in orders different from those illustrated, which may include performing some acts simultaneously.

The method 600 of FIG. 6 may be performed by the first device 110, e.g., by any number of applications, agents, widgets, and/or services that run on the first device 110.

At 610, the first device 110, which has a first session 502 with an online system 140, scans a machine-readable code 172 displayed by a second device 120, which has a second session 504 with the online system 140. The machine-readable code 172 indicates information 114 about the second session 504 and is displayed by the second device 120 in connection with a document 170 of the online system 140. For example, the code 172 may be displayed within the document 170, alongside the document 170, or in some other manner in which the code 172 is associated with the document 170.

At 620, the first device 110 participates in a communication with the online system 140, such as that described in act 193 of FIG. 1, to validate the information 114 indicated by the machine-readable code 172.

At 630, in response to validation of the information 114, the first device 110 transmits a user signature 102 stored in the first device 110 to the online system 140, such that the online system 140 is enabled to enter the user signature 112 into the document 170 to effectuate signing of the document 170.

Turning now to FIG. 7, the method 700 may be performed by the online system 140, e.g., by the software constructs described in connection with FIG. 1, which reside in the memory 150 of the online system 140 and are run by the set of processors 144.

At 710, the online system 140 establishes a first session 502 with a first device 110 and a second session 504 with a second device 120. The first session 502 and the second session 504 may be established in any order. In an example, the second session 504 involves connecting to a virtualized document-processing application 162b, in which a document 170 has been opened for reviewing and signing.

At 720, the online system 140 transmits a machine-readable code 172 to the second device 120 to enable the second device 120 to display the machine-readable code 172. For example, the online system 140 transmits the code 172 as part of screen content rendered by the virtualized document-processing application 162b. As another example, the code 172 may be copied to the second device 120 as a file or other data object. The machine-readable code 172 is associated with the document 170 of the online system 140 and indicates information 114 about the second session 504.

At 730, in response to the online system 140 receiving the information 114 from the first device 110 after the first device 110 has scanned the machine-readable code 172, the online system 140 (i) validates the information 114 and (ii) sends a successful validation result to the first device 110, i.e., assuming validation is successful.

At 740, after sending the successful validation result, the online system 140 receives a user signature 112 from the first device 110 and applies the user signature 112 to the document 170 to effectuate signing of the document 170.

An improved technique has been described for applying signatures to documents. The technique stores a user signature 112 in a first device 110 and selectively releases the user signature 112 for incorporation into documents only after performing validation. The validation includes the first device 110 scanning a machine-readable code 172 displayed by a second device 120. The first device 110 and the second device 120 participate in respective sessions 502 and 504 with an online system 140, which stores a document 170 to be signed. The first device 110 extracts information 114 from the machine-readable code 172 and attempts to validate that information 114 with the online system. If the validation is successful, the first device may release the user signature 112, e.g., by sending the user signature 112 to the online system 140 for incorporation into the document 170.

Having described certain embodiments, numerous alternative embodiments or variations can be made. For example, although embodiments have been described in which documents are opened in a document-processing application 162b, such as Adobe Acrobat or Microsoft Word, embodiments may also be constructed in which documents are accessed by an electronic signature service.

Further, although the described embodiments involve virtualized applications in which screen content of documents 170 and codes 172 is transmitted from the online system 140 to the second device 120, other embodiments may be constructed that transfer the documents and/or codes themselves.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as media 650 and 750 in FIGS. 6 and 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method, comprising:
    scanning, by a first device having a first session with an online system, a machine-readable code displayed by a second device having a second session with the online system, the machine-readable code indicating information about the second session and displayed by the second device in connection with a document of the online system;
    participating, by the first device, in a communication with the online system to validate the information indicated by the machine-readable code; and
    transmitting, responsive to validation of the information, a user signature stored in the first device to the online system, such that the online system is enabled to enter the user signature into the document to effectuate signing of the document;
    wherein the second session is between the second device and a virtual machine hosted by the online system, wherein the information includes a session ID (identifier) of the second session, a username of the second session, and an IP (Internet protocol) address of the virtual machine, and wherein validating the information includes:
        confirming that the online system associates the session ID of the second session with the username of the second session;
        confirming that the username of the second session matches the username of the first session; and confirming that the online system associates the session ID of the second session with the IP address of the virtual machine.

2. The method of claim 1, wherein the information includes a session ID (identifier) of the second session and a username of the second session, and wherein validating the information includes confirming that the online system associates the session ID of the second session with the username of the second session.

3. The method of claim 1, wherein the first session is associated with a username, wherein the information includes a username associated with the second session, and wherein validating the information includes confirming that the username of the second session matches the username of the first session.

4. The method of claim 1, wherein the second session is between the second device and a virtual machine hosted by the online system, wherein the information includes a session ID (identifier) of the second session and an IP (Internet protocol) address of the virtual machine, and wherein validating the information includes confirming that the online system associates the session ID of the second session with the IP address of the virtual machine.

5. The method of claim 1, further comprising prompting a user of the first device to provide an additional authentication factor to the first device, wherein transmitting the user signature is further responsive to successful validation of the additional authentication factor.

6. The method of claim 1, further comprising:
after transmitting the user signature to the online system, receiving, by the first device, a request from the online system to obtain the user signature for signing a second document;
prompting, by the first device, a user of the first device to authorize transmission of the user signature; and
in response to the first device receiving authorization from the user and without the first device scanning or rescanning any machine-readable code, transmitting the user signature to the online system, such that the online system is enabled to enter the user signature into the second document to effectuate signing of the second document.

7. The method of claim 6, wherein prompting the user of the first device to authorize transmission of the user signature includes requesting an additional authentication factor from the user.

8. The method of claim 1, wherein the second session is between the second device and an application of the online system.

9. The method of claim 1, further comprising, prior to transmitting the user signature:
generating, by the first device, a client public/private key pair that includes a client public key and a client private key;
sending, by the first device, the client public key to the online system;
receiving, by the first device, a message from the online system, the message encrypted using the client public key and including a server public key of a server public/private key pair;
decrypting, by the first device, the message using the client private key, the decrypting revealing the server public key; and
encrypting, by the first device, the user signature using the server public key.

10. The method of claim 9, wherein generating the client public/private key pair is performed by one of a trusted platform module or secure enclave of the first device.

11. A method, comprising:
establishing, by an online system, a first session with a first device and a second session with a second device;
transmitting, by the online system, a machine-readable code to the second device to enable the second device to display the machine-readable code, the machine-readable code associated with a document of the online system and indicating information about the second session;
in response to the online system receiving the information from the first device after the first device has scanned the machine-readable code, (i) validating the information and (ii) sending a successful validation result to the first device; and
after sending the successful validation result, receiving a user signature from the first device and applying the user signature to the document to effectuate signing of the document;
wherein the second session is between the second device and a virtual machine hosted by the online system, wherein the information includes a session ID (identifier) of the second session, a username of the second session, and an IP (Internet protocol) address of the virtual machine, and wherein validating the information includes:
confirming that the online system associates the session ID of the second session with the username of the second session;
confirming that the username of the second session matches the username of the first session; and
confirming that the online system associates the session ID of the second session with the IP address of the virtual machine.

12. The method of claim 11, further comprising enforcing a requirement that the signature be entered into the document based on the authorization by the first device.

13. The method of claim 11, further comprising prohibiting the signature from being entered into the document from the second device.

14. The method of claim 11, wherein the information indicates a user associated with the second session, and wherein validating the information includes confirming that the user associated with the second session matches a user associated with the first session.

15. The method of claim 11, wherein the second session is between the second device and a virtual machine hosted by the online system, wherein the information includes a session ID (identifier) of the second session and an IP (Internet protocol) address of the virtual machine, and wherein validating the information includes confirming, by the online system, that the session ID of the second session is associated with the IP address of the virtual machine.

16. The method of claim 11, wherein the second session is between the second device and a virtual machine hosted by the online system, and wherein transmitting the machine-readable code to the second device includes (i) rendering the machinereadable code within an application running on the virtual machine and (ii) enabling the second device to display output of the application.

17. The method of claim 16, wherein the application is configured with a plugin that renders machine-readable codes with respective documents provided for signature.

18. The method of claim 17, wherein the plugin requires that signatures be entered in documents based solely on validation of machine-readable codes and not based on any other signature-entry methods.

19. The method of claim 16, further comprising, after applying the user signature to the document to effectuate signing of the document:
presenting a second document for signature without transmitting any additional machine-readable code;
sending a request to the first device to authorize signing of the second document;
receiving, based on authorization by the first device, the user signature from the first device; and
applying the user signature to the second document to effectuate signing of the second document.

20. A computerized system, comprising control circuitry that includes a set of processing units coupled to memory, the control circuitry constructed and arranged to:
establish a first session with a first device and a second session with a second device;
transmit a machine-readable code to the second device to enable the second device to display the machine-readable code, the machine-readable code associated with a document of the online system and indicating information about the second session;
in response to receipt of the information from the first device after the first device has scanned the machine-readable code, (i) validate the information and (ii) send a successful validation result to the first device; and
after the successful validation result, receive a user signature from the first device and apply the user signature to the document to effectuate signing of the document;
wherein the second session is between the second device and a virtual machine hosted by the online system, wherein the information includes a session ID (identifier) of the second session, a username of the second session, and an IP (Internet protocol) address of the virtual machine, and wherein validating the information includes:
confirming that the online system associates the session ID of the second session with the username of the second session;
confirming that the username of the second session matches the username of the first session; and
confirming that the online system associates the session ID of the second session with the IP address of the virtual machine.

21. The computerized system of claim 18, wherein the information indicates a user associated with the second session, and wherein validation of the information includes confirming that the user associated with the second session matches a user associated with the first session.

* * * * *